(12) United States Patent
Scharboneau et al.

(10) Patent No.: US 11,629,629 B2
(45) Date of Patent: Apr. 18, 2023

(54) VEHICLE EXHAUST PIPE SUPPORT ASSEMBLY

(71) Applicant: International Truck Intellectual Property Company, LLC, Lisle, IL (US)

(72) Inventors: Gerald Paul Scharboneau, Naperville, IL (US); Jose Israel Landeros Mendoza, Aurora, IL (US); Dustin Wade Larkey, Downers Grove, IL (US); Antonio Humberto Chavez Villalobos, Aurora, IL (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 190 days.

(21) Appl. No.: 17/225,910

(22) Filed: Apr. 8, 2021

(65) Prior Publication Data

US 2022/0325654 A1    Oct. 13, 2022

(51) Int. Cl.
*F01N 13/18*    (2010.01)
*F01N 13/08*    (2010.01)
*F01N 13/10*    (2010.01)
*B62D 33/06*    (2006.01)

(52) U.S. Cl.
CPC ......... *F01N 13/1805* (2013.01); *B62D 33/06* (2013.01); *F01N 13/082* (2013.01); *F01N 13/10* (2013.01)

(58) Field of Classification Search
CPC ............. F01N 13/1805; F01N 13/1816; F01N 2590/08; F01N 13/08
See application file for complete search history.

(56) References Cited

U.S. PATENT DOCUMENTS

| | | | |
|---|---|---|---|
| 4,907,666 A | 3/1990 | Tecco | |
| 5,649,685 A * | 7/1997 | Keller | B60K 13/04 248/610 |
| 5,873,429 A * | 2/1999 | Qutub | F01N 13/1822 248/59 |
| 5,908,187 A * | 6/1999 | Kalkoske | F01N 13/1822 248/635 |
| 6,095,460 A * | 8/2000 | Mercer | F01N 13/1822 248/608 |
| 6,412,586 B1 | 7/2002 | Askew | |
| 7,614,475 B2 | 11/2009 | Askew | |
| 2007/0169981 A1 * | 7/2007 | Connelly | F16L 3/16 180/309 |

* cited by examiner

*Primary Examiner* — Anthony Ayala Delgado
(74) *Attorney, Agent, or Firm* — Mark C. Bach

(57) ABSTRACT

A support assembly for supporting an upright engine exhaust pipe on an exterior wall of a truck cab at a location below an outlet of the exhaust pipe. The support assembly allows limited cab motion relative to the exhaust pipe.

18 Claims, 6 Drawing Sheets

VEHICLE EXHAUST PIPE SUPPORT ASSEMBLY

TECHNICAL FIELD

The disclosed subject matter relates to a motor vehicle, such as a truck vehicle, having a vertically upright exhaust pipe on the exterior of a cab of the vehicle.

BACKGROUND

Large vocational motor vehicles, such as heavy trucks for example, are powered by internal combustion engines, such as diesel engines. Certain vehicles have a driver's cab and an engine exhaust system which includes at least one exhaust pipe that extends vertically upwardly exteriorly adjacent the cab to convey engine exhaust upwardly to an exhaust outlet which is typically disposed at an elevation above the cab.

There are various arrangements for mounting a vertically upright exhaust pipe on a large vocational vehicle, such as a heavy truck. Some support the exhaust pipe on a chassis frame of the vehicle and/or on a cab. Another type of mounting comprises a stanchion which is mounted on a chassis frame and to which an upright exhaust pipe is attached. Another type of mounting comprises a support assembly which allows some limited relative movement between the exhaust pipe and a point of attachment of the support assembly to the cab's body. One example of such a support assembly is disclosed in U.S. Pat. No. 9,216,645, issued Dec. 22, 2015. Another known example is a flexible rubber flap attached at one end to the cab and attached to the exhaust pipe at an opposite end.

SUMMARY

A general aspect of the disclosed subject matter relates to a motor vehicle having a chassis supporting a fuel-consuming engine within which fuel is combusted to propel the vehicle and a cab for a driver of the vehicle which is also supported on the chassis.

The engine comprises one or more exhaust manifolds and an engine exhaust system through which exhaust created by combustion of fuel within the engine is conveyed from the one or more exhaust manifolds to, and then through, an exhaust pipe assembly comprising an exhaust pipe having a length which extends vertically upward exteriorly adjacent the cab to an exhaust outlet through which exhaust exits the exhaust system.

An exhaust pipe support assembly supports the exhaust pipe assembly on the cab at a location spaced vertically below the exhaust outlet, and includes a first bracket mounted on the exhaust pipe assembly, a second bracket mounted on the cab, and a frame which is mounted on one of the two brackets. The frame has a length, a width, and a thickness. A cavity is disposed centrally of the frame's length and width and extends completely through the frame's thickness.

The cavity is bounded lengthwise of the frame by first and second walls having symmetrically opposite bearing surfaces which face each other across the cavity and which are in registration with each other both widthwise and thicknesswise of the frame. The bearing surfaces, when viewed widthwise of the frame, lie on respective circular arcs having identical radii.

The cavity is bounded widthwise of the frame by third and fourth walls having surfaces which face each other across the cavity and which are in registration with each other both lengthwise and thicknesswise of the frame.

A rotor is captured within the cavity with clearance to the surfaces of the first, second, third, and fourth walls bounding the cavity and has symmetrically opposite side surfaces which extend widthwise of the cavity, which face away from each other, and which when viewed in a direction widthwise of the frame, lie on respective circular arcs having identical radii each confronting a respective bearing surface with clearance to the respective bearing surface to journal the rotor for turning within the cavity about an axis of turning extending widthwise of the frame.

The rotor also has a central through-hole having a straight axis which intersects the axis of turning and lies in an imaginary plane that is perpendicular to the axis of turning and that bisects the cavity widthwise between the surfaces of the third and fourth walls of the frame.

A rod is mounted on the other of the two brackets and passes coaxially through the through-hole in the rotor with sufficient length and clearance to guide the rotor for coaxial translation along, and coaxial turning within, the through-hole.

Elastomeric isolators are held compressed thicknesswise of the frame between lengthwise opposite end portions of the frame and portions of the one bracket which confront the lengthwise opposite end portions of the frame.

The foregoing summary is accompanied by further detail of the disclosure presented in the Detailed Description below with reference to the following drawing Figures which are part of this disclosure.

DETAILED DESCRIPTION

Figure 1:
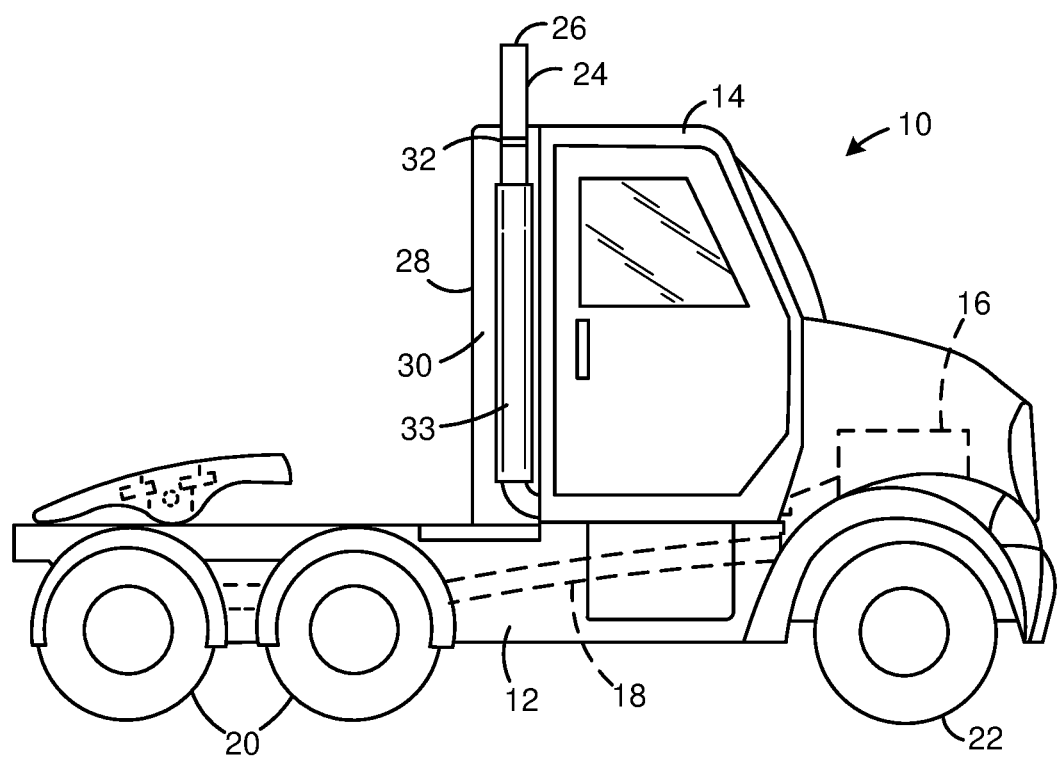
FIG. 1 is a right side elevation view of a truck vehicle.

FIG. 1 shows an example of a truck vehicle 10, specifically a highway tractor, having a chassis 12 and a cab 14. Chassis 12 has a chassis-frame which supports not only cab 14 but also a fuel-consuming combustion engine 16 (such as diesel or gasoline) which is a component of the vehicle's powertrain 18. Powertrain 18 has a drivetrain which couples engine 16 with drive wheels 20 for propelling truck vehicle 10 on an underlying surface, such as a roadway. The example of drive wheels 20 shown in FIG. 1 is representative of a tandem axle configuration, commonly used in highway tractors. Truck vehicle 10 also has front steered wheels 22 which are steered by a driver inside cab 14.

Exhaust created by combustion of fuel in engine 16 is conveyed from one or more engine exhaust manifolds (the number depending on type of engine) through, and ultimately out of, an engine exhaust system. One section of the exhaust system coming from the engine underlies cab 14 and typically contains one or more mufflers and various exhaust aftertreatment devices through which engine exhaust passes before coming to a rigid S-pipe 23 shown in FIG. 2. S-pipe 23 is supported by a bracket 25 from a component in the chassis underlying cab 14. S-pipe 23 emerges from underneath the cab and is rigidly connected to an entrance of an upright exhaust pipe 24 to direct the exhaust flow into exhaust pipe 24. The exhaust pipe forms a stack, which is exteriorly adjacent cab 14, for conveying the exhaust flow upwardly to an outlet 26 through which the exhaust exits exhaust pipe 24. The nature of the connection of the entrance of exhaust pipe 24 through S-pipe 23 to a component mounted on the chassis renders the inlet end of exhaust pipe 24 immovable relative to the chassis.

As shown in FIG. 1, cab 14 has a body which comprises a rear wall 28 and a right side wall 30 which extends frontally from rear wall 28 on the right side of the cab body. An exhaust pipe support assembly 32 supports exhaust pipe 24 on the body of cab 14 below outlet 26 but in doing so allows limited movement between cab 14 and exhaust pipe 24 in a manner to be explained more fully hereinafter.

Figure 2:
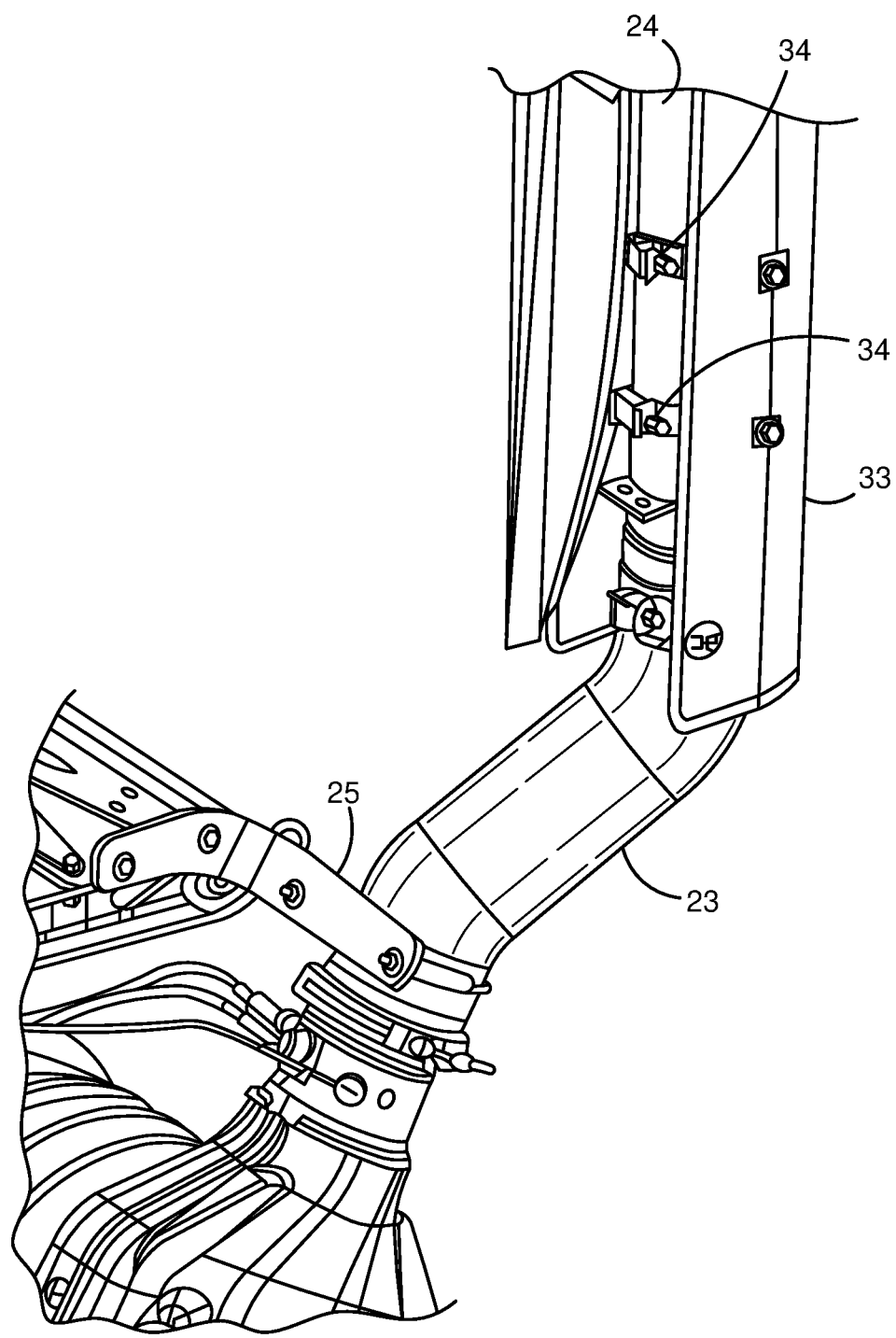
FIG. 2 is a fragmentary perspective view showing a portion of an engine exhaust system of the vehicle.

FIG. 2 also shows a portion of a heat shield 33 partially surrounding, and mounted on, exhaust pipe 24 via bands 34 which girdle, and are tightened onto, exhaust pipe 24 and to which heat shield 33 is attached. Heat shield 33 may extend vertically to, or even beyond, exhaust pipe support assembly 32 as suggested by the uppermost band 34 in FIG. 3 although the heat shield is not shown in that FIG. In FIG. 1 an uppermost portion of the heat shield has been removed to show the location of exhaust pipe support assembly 32.

Figure 3:
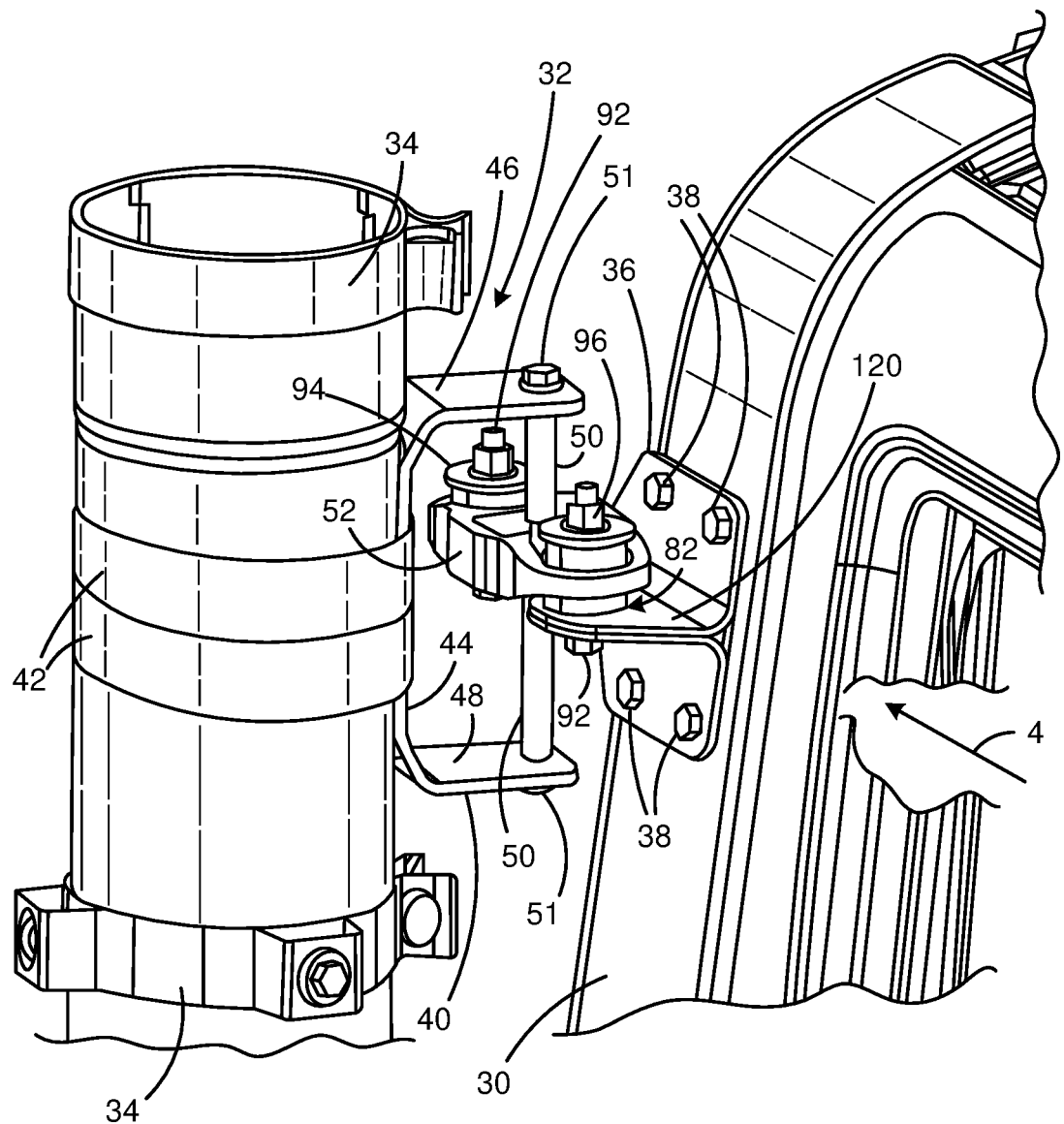
FIG. 3 is a fragmentary perspective view showing more of the engine exhaust system, including an exhaust pipe support assembly for supporting an upright exhaust pipe.
Figure 4:
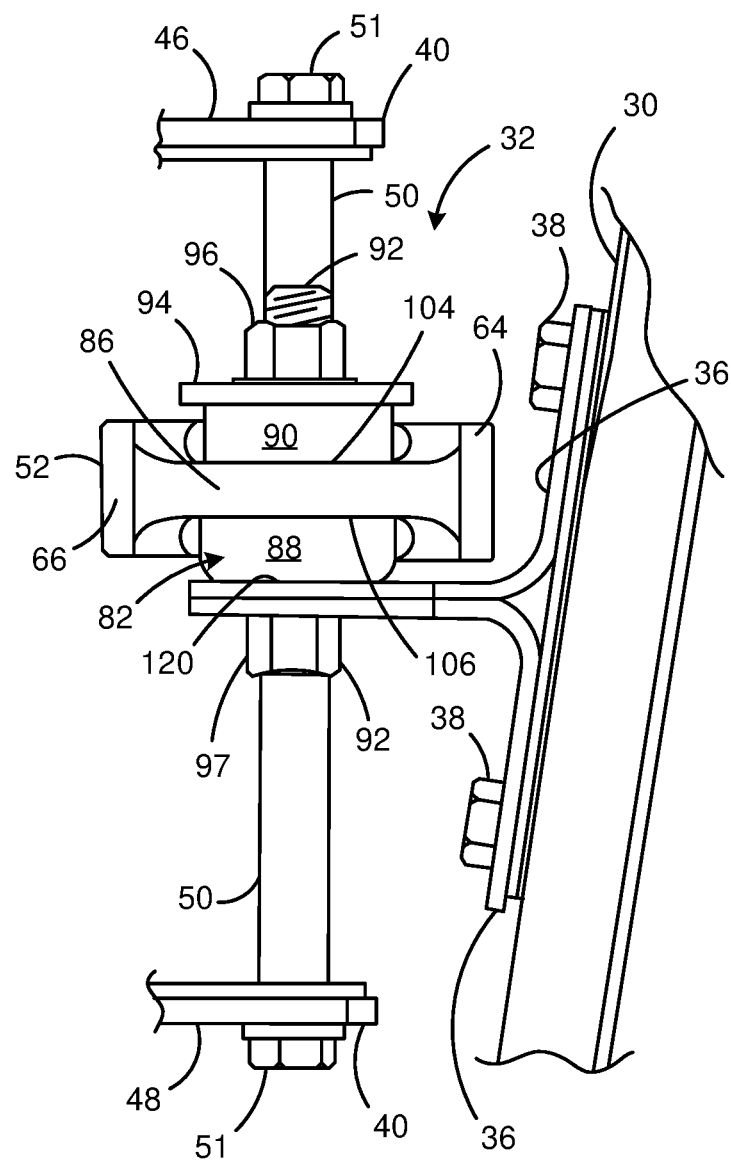
FIG. 4 is an enlarged perspective view in the direction of arrow 4 in FIG. 3, showing the exhaust pipe support assembly and its attachment to the cab.

FIGS. 3 and 4 show exhaust pipe support assembly 32 supporting exhaust pipe 24 on cab 14 at a location spaced vertically below exhaust outlet 26. A multi-piece first metal bracket 36 is fastened to right sidewall 30 by screws 38. A C-shaped second metal bracket 40 is held fast on exhaust pipe 24 by metal bands 42 which overlie the bracket's vertical base 44 while girdling the exhaust pipe and holding bracket 40 fast against the exhaust pipe by circumferential tensioning of the bands.

Bracket 40 has an upper arm 46 and a lower arm 48 extending from upper and lower ends of base 44 in parallel directions away from exhaust pipe 24 and toward sidewall 30. Both arms are flat and face each other to form a throat of bracket 40. A circular cylindrical stainless steel rod 50 spans the bracket's throat at a distance from base 44. Rod 50 has lengthwise opposite ends which are fastened to upper arm 46 and lower arm 48 respectively.

Arms 46, 48 have respective circular through-holes spaced equidistant from base 44 and vertically coaxially aligned with each other along a vertical axis. Rod 50 fits between the arms and with each of its opposite ends in alignment with a respective one of the through-holes in the arms. Opposite ends of rod 50 have respective threaded holes. A respective screw 51 passes through each through-hole and is threaded to the through-hole in the respective rod end and then tightened to secure rod 50 fast to bracket 40.

FIGS. 3-6 show exhaust pipe support assembly 32 to comprise a one-piece frame 52 having a length, a width, and a thickness. A cavity 54 is disposed centrally of the frame's length and width and extends completely through the frame's thickness. A suitable material for the frame is an acetal resin.

Cavity 54 is bounded lengthwise of frame 52 by first and second walls 56, 58 having symmetrically opposite bearing surfaces 60, 62 (see FIGS. 7-9) which face each other across the cavity and which are in registration with each other both widthwise and thicknesswise of the frame. The bearing surfaces are concave and, when viewed widthwise of the frame, lie on respective circular arcs having identical radii.

Figure 6:
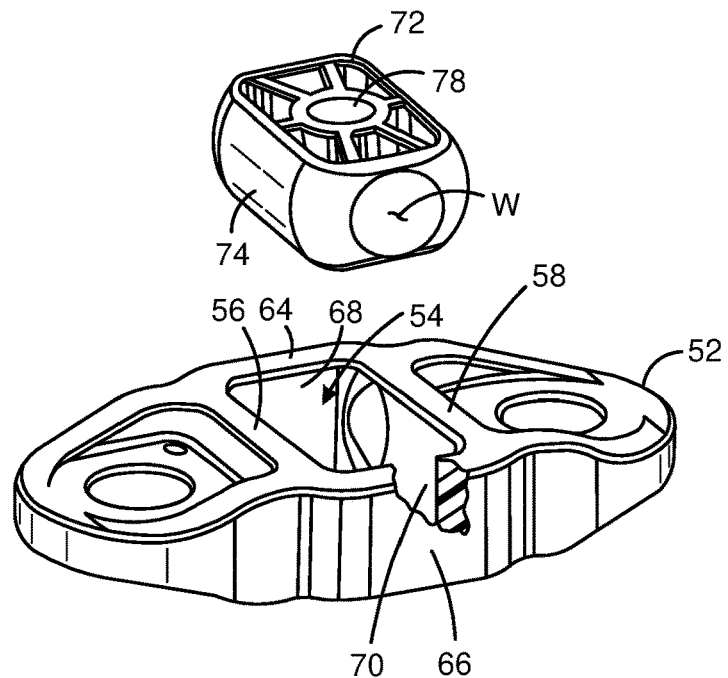
FIG. 6 is another exploded perspective view showing only two of the elements from FIG. 5, one of which is shown in a different orientation from that of FIG. 5.

Cavity 54 is bounded widthwise of frame 52 by third and fourth walls 64, 66 having surfaces 68, 70 which face each other across the cavity and which are in registration with each other both lengthwise and thicknesswise of the frame. A portion of FIG. 6 is broken away to show surface 70.

A rotor 72 is captured within cavity 54 with clearance to surfaces 60, 62, 68, 70. Rotor 72 comprises symmetrically opposite side surfaces 74, 76 which extend widthwise of the cavity and face away from each other. When viewed in a direction widthwise of frame 52, side surfaces 74, 76 are convex and lie on respective circular arcs having identical radii each confronting a respective bearing surface 60, 62 (see FIG. 4) with dimensional clearance to the respective bearing surface sufficiently small to journal rotor 72 for smoothly turning within the cavity about an axis of turning extending widthwise of the frame.

Rotor 72 further comprises a central through-hole 78 having a straight axis which intersects the axis of turning and lies in an imaginary plane that is perpendicular to the axis of turning and that bisects cavity 54 widthwise between surfaces 68, 70.

Rod 50 passes coaxially through through-hole 78. The surface of through-hole 78 has sufficient clearance to the surface of rod 50 for guiding rotor 72 for smooth coaxial translation along the rod's length, while also allowing the rotor to smoothly turn coaxially on the rod.

A suitable material for rotor 72 is nylon 6 (glass-reinforced).

Figure 5:
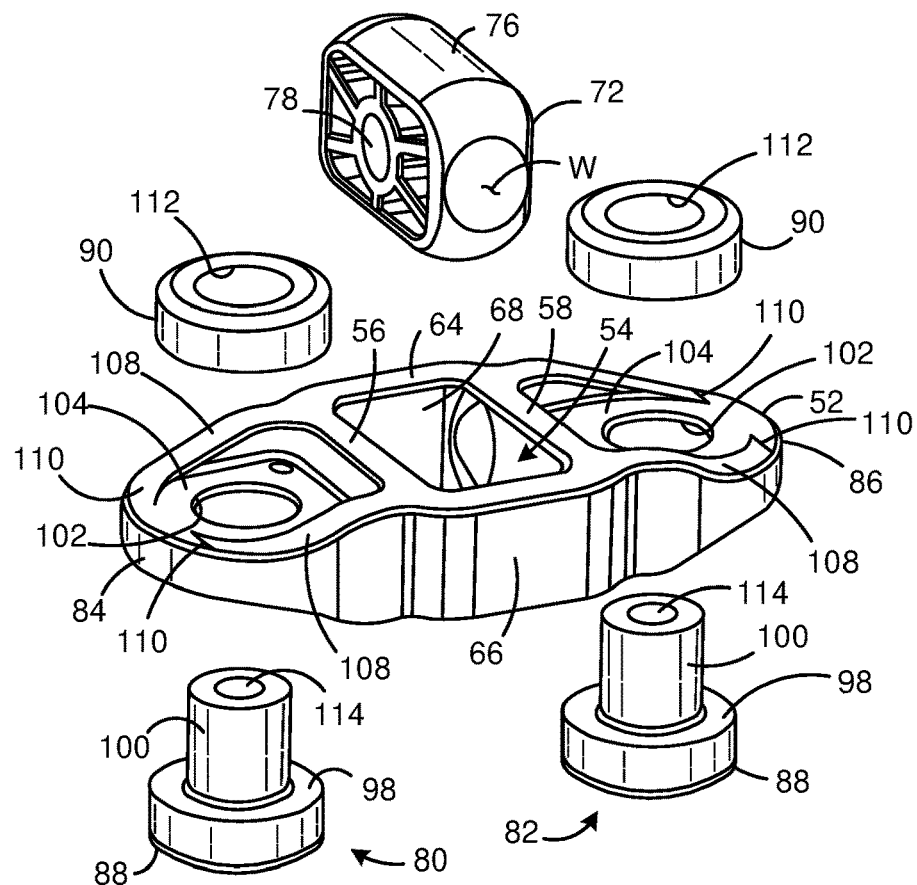
FIG. 5 is an exploded perspective view showing certain elements of the exhaust pipe support assembly.

Collectively, FIGS. 3-5 show elastomeric isolators 80, 82, which in FIGS. 3 and 4 are seen being held compressed thicknesswise of frame 52 on lengthwise opposite end sections 84, 86 of the frame adjoining walls 56, 58 respectively. Each elastomeric isolator has several parts, namely an elastomeric plug 88, an elastomeric ring 90, a metal bolt 92, a metal washer 94, and a metal nut 96. The metal parts are shown only in FIGS. 3 and 4. How the elastomeric parts are assembled to frame 52 is suggested by FIG. 5 as will be explained below.

Each end section 84, 86 of frame 52 has a circular through-hole 102 whose length runs thicknesswise of the frame and whose axis lies in the imaginary plane that is perpendicular to the axis of turning of rotor 72 and that bisects cavity 54 widthwise between surfaces 68, 70. Each end section 84, 86 has flat opposite surfaces 104, 106 (FIG. 4) surrounding the respective through-hole 102. A ridge 108 partially bounds each flat surface. Part of each ridge is formed by a portion of a respective wall 56, 58. From locations where walls 56, 58 adjoin walls 64, 66, the remainder of each ridge extends away from the respective wall 56, 58 with decreasing thickness thicknesswise of frame 52 to partially surround the respective through-hole 102. The ridges terminate by blending into the respective flat surface 104, 106 so that a portion of each flat surface 104, 106 extends lengthwise of frame 52 beyond terminations 110 of the respective ridge.

Each plug 88 has a circular cylindrical head 98 and a circular cylindrical shank 100. A distal end of each shank opposite the respective head is aligned with the respective through-hole 102, as suggested by FIG. 5, and the distal end of the shank is inserted into through-hole 102. The plug is more fully inserted into the through-hole until a flat annular surface of head 98 which surrounds shank 100 is disposed against the flat surface 106 of the respective end section 84, 86. Each shank 100 has a length greater than that of the respective through-hole 102, leaving a distal end portion of each shank protruding from the respective through-hole. Each ring 90 has a through-hole 112 which allows the ring to fit closely onto the protruding end portion of the respective shank to dispose a circular annular surface of the ring against the respective flat surface 104. Each plug 88 also has a circular cylindrical through-hole 114 coaxial with the plug's head and shank.

As shown by FIGS. 3 and 4, a respective bolt 92, a respective nut 96, and a respective washer 94 function to hold end sections 84, 86 of frame 52 fast on a pedestal 120 of bracket 36 while also axially compressing the elastomeric parts of isolators 80, 82. The end surface of each plug 88 at head 98 is disposed to align the plug's through-hole 114 with a respective through-hole in pedestal 120. The shank of each bolt 92 is passed first through the respective through-hole in the pedestal, and then further through the respective through-hole 114 in plug 88 and the respective washer 94, until the bolt's head 97 (FIG. 4) abuts the pedestal and the distal end of the bolt's shank protrudes beyond washer 94 to allow the respective nut 96 to be threaded onto the bolt's shank. Nut 96 has an overall diameter greater than that of the through-hole in washer 94 so that as the nut is being tightened, the bolt shank will be tensioned axially to force the elastomeric parts to compress axially, with ring 90 being compressed between washer 94 and surface 104 and with head 98 of plug 88 being compressed between pedestal 120 and surface 106, until a desired amount of compression is reached. That amount will hold the isolators fast while providing a limited amount of deformation in any direction transverse to the direction of axial compression.

There are several ways to assemble the various parts which have been described. For example, bracket 36 can first be fastened to the cab body and then frame 52 mounted on pedestal 120 as just explained. After that, through-hole 78 in rotor 72 can be aligned with the through-holes in arms 46, 48 of bracket 44, and then rod 50 can be passed through through-hole 78, the rod ends aligned with the through-holes in arms 46, 48, and the rod fastened to the arms, as explained earlier. Alternately, frame 52 could be mounted on bracket 36 before that bracket is fastened to the cab body.

Figure 7:
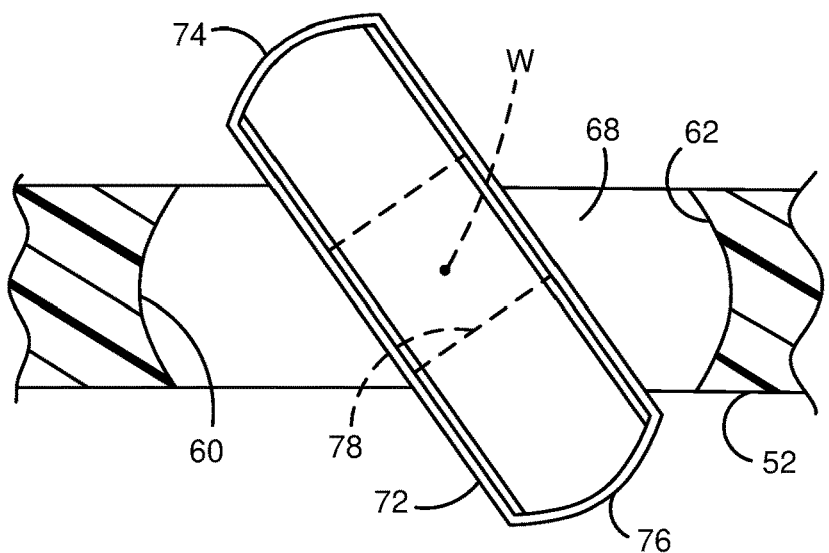
FIG. 7 is an enlarged diagrammatic view viewed widthwise of the exhaust pipe support assembly for explaining a sequence of assembling the two elements shown in FIG. 6.
Figure 8:
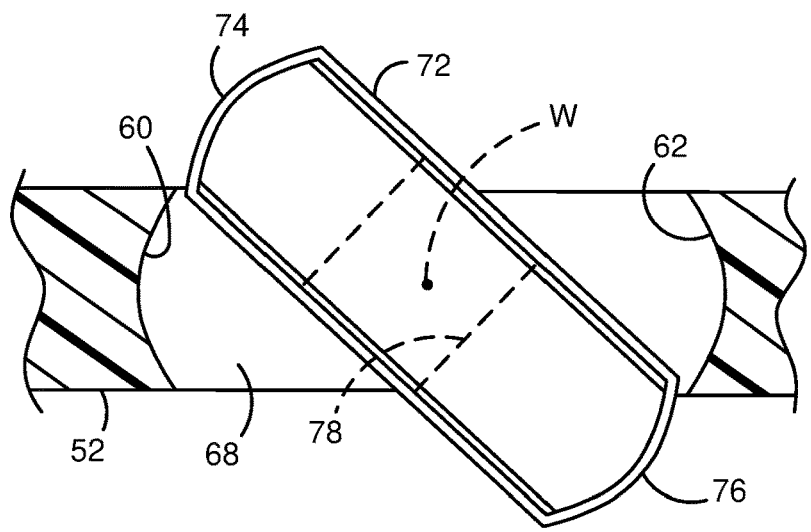
FIG. 8 is an enlarged diagrammatic view viewed widthwise of the exhaust pipe support assembly for explaining a sequence of assembling the two elements shown in FIG. 6.
Figure 9:
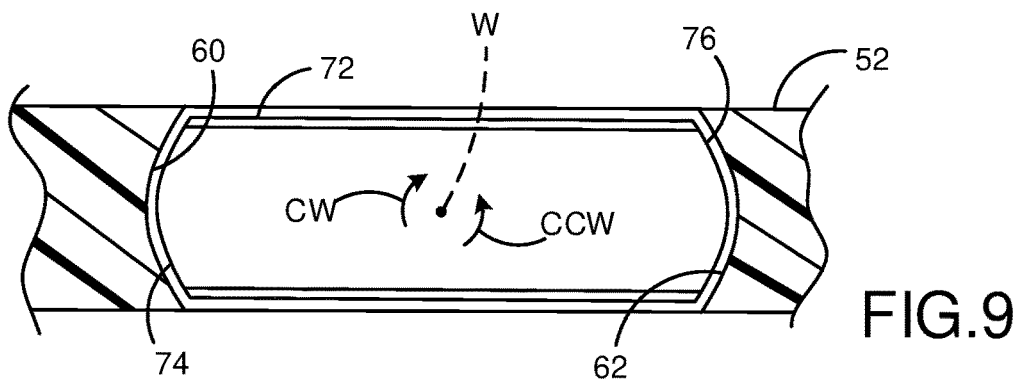
FIG. 9 is an enlarged diagrammatic view viewed widthwise of the exhaust pipe support assembly for explaining a sequence of assembling the two elements shown in FIG. 6.

The manner of assembling rotor 72 to frame 52 is explained with reference to FIGS. 5-9. FIGS. 4, 6, and 9 show rotor 72 in the same orientation as in FIG. 3 with its surfaces 74, 76 in full confrontational registration with bearing surfaces 60, 62. From that orientation the rotor can turn either clockwise (arrow CW) or counterclockwise (arrow CCW) about the widthwise extending axis of turning W. The orientation of the exhaust pipe support assembly 32 in vehicle 10 places axis W to run laterally of vehicle 10. Consequently, as cab body 14 pitches fore or aft on chassis 12, such motion, relative to exhaust pipe 24 on which rod 50 is mounted, will result in rotor 72 turning about axis W as indicated by arrow CW or arrow CCW.

A typical range of pitch is only a small number of degrees, and so relative movement between bearing surfaces 60, 62 of frame 52 and the confronting surfaces 74, 76 of rotor 72 will be small, assuring that journaling of the rotor by the frame for turning about axis W is maintained. Vertical motion of cab body 14 relative to the chassis is also not transmitted to exhaust pipe 52 because rotor 72 can translate along rod 50 even when the rotor turns a few degrees about axis W. Horizontal fore-aft and lateral motions between cab body 14 and exhaust pipe 24, if any, are insignificant, similarly for roll and yaw motions, and any such motions can be compensated for by deformation of the elastomeric isolators.

How rotor 72 is assembled to frame 52 will be explained with reference to FIGS. 5 and 7-9. With the rotor oriented as in FIG. 5 in widthwise registry with cavity 54, it can be moved into the cavity (FIG. 7). From there, it is turned about its widthwise extending axis W to begin turning its side surfaces 74, 76 toward bearing surfaces 60, 62. Continued turning starts to bring the side surfaces into partial confrontation with the bearing surfaces (FIG. 8), and still further turning will bring full confrontation (FIG. 9). Once partial confrontation begins, rotor 72 becomes captured in cavity 54.

The foregoing description has presented upright exhaust pipe 24 as a functional element in an exhaust system of an internal combustion engine. Certain vehicles however may have a prime mover other than a combustion engine. An electric motor is an example of such an alternative prime mover, and it does not require an upright exhaust pipe. However, in order to maintain the traditional outward appearance of a combustion engine powered vehicle, a vehicle operated by an alternative (non-combustion) prime mover may have a stack presenting an outward appearance of an upright exhaust pipe mounted on the vehicle's chassis. Such a non-functional exhaust pipe is sometimes referred to as a "dummy" exhaust pipe. Such a stack can be also attached to the cab using the support assembly 32 described here.

A variation on how support assembly 32 can be used with a combustion engine powered vehicle is to mount it on a surrounding heat shield 33, rather than directly on the vertical exhaust pipe 24, provided that the heat shield is securely mounted on the exhaust pipe.

What is claimed is:
1. A vehicle comprising:
a chassis supporting a fuel-consuming engine within which fuel is combusted to propel the vehicle, the engine comprising one or more exhaust manifolds;
a cab supported on the chassis;
an engine exhaust system through which exhaust created by combustion of fuel within the engine is conveyed from the one or more exhaust manifolds to, and then through, an exhaust pipe having a length which extends vertically upward exteriorly adjacent the cab to an exhaust outlet through which exhaust exits the exhaust system;
an exhaust pipe support assembly which supports the exhaust pipe on the cab at a location spaced vertically below the exhaust outlet, and which comprises a first bracket mounted on the exhaust pipe and a second bracket mounted on the cab;
the exhaust pipe support assembly further comprising a frame having a length, a width, and a thickness and comprising a cavity disposed centrally of the frame's length and width and extending completely through the frame's thickness;
the cavity being bounded lengthwise of the frame by first and second walls having symmetrically opposite bearing surfaces which face each other across the cavity and which are in registration with each other both widthwise and thicknesswise of the frame;

the bearing surfaces, when viewed widthwise of the frame, lying on respective circular arcs having identical radii;

the cavity being bounded widthwise of the frame by third and fourth walls having surfaces which face each other across the cavity and which are in registration with each other both lengthwise and thicknesswise of the frame;

a rotor which is captured within the cavity with clearance to the surfaces of the first, second, third, and fourth walls bounding the cavity and which comprises symmetrically opposite side surfaces which extend widthwise of the cavity, which face away from each other, and which when viewed in a direction widthwise of the frame, comprise respective circular arcs having identical radii each confronting a respective bearing surface with clearance to the respective bearing surface to journal the rotor for turning within the cavity about an axis of turning extending widthwise of the frame;

the rotor further comprising a central through-hole having a straight axis which intersects the axis of turning and lies in an imaginary plane that is perpendicular to the axis of turning and that bisects the cavity widthwise between the surfaces of the third and fourth sides of the frame;

a rod which is mounted on one of the first and second brackets and passes coaxially through the through-hole in the rotor with sufficient length and clearance to guide the rotor for coaxial translation along, and coaxial turning within, the through-hole;

and elastomeric isolators held compressed against thicknesswise opposite surfaces of the frame at lengthwise opposite ends of the frame.

2. The vehicle as set forth in claim 1 wherein the bearing surfaces, when viewed widthwise of the frame, are circularly concave, and the side surfaces of the rotor are circularly convex.

3. The vehicle as set forth in claim 1 wherein the rod is mounted on the first bracket, and the elastomeric isolators are held compressed by metal fasteners which fasten the lengthwise opposite ends of the frame to the second bracket.

4. The vehicle as set forth in claim 3 wherein the cab has a rear wall and a side wall extending frontally of the vehicle from the rear wall, and the second bracket is fastened to the side wall.

5. The vehicle as set forth in claim 4 wherein the axis of turning of the rotor extends laterally of the vehicle, and the elastomeric isolators are held compressed in a vertical direction.

6. The vehicle as set forth in claim 3 wherein each elastomeric isolator comprises two elastomeric parts, a first of which is a circular ring and a second of which is a plug, each lengthwise opposite end of the frame comprises a vertical through-hole bounded at opposite ends by the thicknesswise opposite surfaces of the frame, the plug comprises a circular head having a flat perimeter surface disposed against one of the thicknesswise opposite surfaces of the frame and a circular cylindrical shank extending from the head through and beyond the respective vertical through-hole to place a distal end portion of the shank protruding from the vertical through-hole, the plug having a central through hole, a respective circular ring fitting onto the respective protruding distal end portion of the shank to dispose a surface of the ring against the other of the thicknesswise opposite surfaces of the frame, and the metal fasteners which fasten lengthwise opposite ends of the frame to the second bracket while axially compressing the ring and the plug at each lengthwise opposite end include a metal bolt, a metal washer, and a metal nut, the bolt having a head disposed against the second bracket, a shank which passes through a through-hole in the second bracket, then through the through-hole in the plug and through the ring to protrude beyond the ring, the metal washer being disposed onto the protruding bolt shank and against the ring, and the metal nut being threaded onto the protruding bolt shank and tightened.

7. A truck vehicle comprising:

a chassis;

a cab supported on the chassis;

a stack presenting an outward appearance of a vertical exhaust pipe and having a lower end supported on the chassis and having a length which extends vertically upward exteriorly adjacent the cab to an upper end;

a support assembly which supports the stack on the cab at a location spaced vertically below the upper end of the stack and comprises a first mounting on the stack and a second mounting on the cab;

the support assembly further comprising a frame having a length, a width, and a thickness and comprising a cavity disposed centrally of the frame's length and width and extending completely through the frame's thickness;

the cavity being bounded lengthwise of the frame by first and second walls having symmetrically opposite bearing surfaces which face each other across the cavity and which are in registration with each other both widthwise and thicknesswise of the frame;

the bearing surfaces, when viewed widthwise of the frame, lying on respective circular arcs having identical radii;

the cavity being bounded widthwise of the frame by third and fourth walls having surfaces which face each other across the cavity and which are in registration with each other both lengthwise and thicknesswise of the frame;

a rotor which is captured within the cavity with clearance to the surfaces of the first, second, third, and fourth walls bounding the cavity and which comprises symmetrically opposite side surfaces which extend widthwise of the cavity, which face away from each other, and which when viewed in a direction widthwise of the frame, comprise respective circular arcs having identical radii each confronting a respective bearing surface with clearance to the respective bearing surface to journal the rotor for turning within the cavity about an axis of turning extending widthwise of the frame;

the rotor further comprising a central through-hole having a straight axis which intersects the axis of turning and lies in an imaginary plane that is perpendicular to the axis of turning and that bisects the cavity widthwise between the surfaces of the third and fourth sides of the frame;

one of the first and second mountings comprising a rod having length which is parallel with length of the stack and which passes coaxially through the through-hole in the rotor with sufficient length and clearance to guide the rotor for coaxial translation along, and coaxial turning on, the rod;

and elastomeric isolators held compressed against thicknesswise opposite surfaces of the frame at lengthwise opposite ends of the frame.

8. The truck vehicle as set forth in claim 7 wherein the bearing surfaces, when viewed widthwise of the frame, are circularly concave, and the side surfaces of the rotor are circularly convex.

9. The truck vehicle as set forth in claim 7 wherein the rod is mounted on a first bracket, and the elastomeric isolators are held compressed by metal fasteners which fasten the lengthwise opposite ends of the frame to a second bracket.

10. The truck vehicle as set forth in claim 9 wherein the cab has a rear wall and a side wall extending frontally of the vehicle from the rear wall, and the second bracket is fastened to the side wall.

11. The truck vehicle as set forth in claim 10 wherein the axis of turning of the rotor extends laterally of the vehicle, and the elastomeric isolators are held compressed in a vertical direction.

12. The truck vehicle as set forth in claim 9 wherein each elastomeric isolator comprises two elastomeric parts, a first of which is a circular ring and a second of which is a plug, each lengthwise opposite end of the frame comprises a vertical through-hole bounded at opposite ends by the thicknesswise opposite surfaces of the frame, the plug comprises a circular head having a flat perimeter surface disposed against one of the thicknesswise opposite surfaces of the frame and a circular cylindrical shank extending from the head through and beyond the respective vertical through-hole to place a distal end portion of the shank protruding from the vertical through-hole, the plug having a central through hole, a respective circular ring fitting onto the respective protruding distal end portion of the shank to dispose a surface of the ring against the other of the thicknesswise opposite surfaces of the frame, and the metal fasteners which fasten lengthwise opposite ends of the frame to the second bracket while axially compressing the ring and the plug at each lengthwise opposite end include a metal bolt, a metal washer, and a metal nut, the bolt having a head disposed against the second bracket, a shank which passes through a through-hole in the second bracket, then through the through-hole in the plug and through the ring to protrude beyond the ring, the metal washer being disposed onto the protruding bolt shank and against the ring, and the metal nut being threaded onto the protruding bolt shank and tightened.

13. A vehicle comprising:
a chassis;
the chassis comprising a powertrain having a prime mover coupled through a drivetrain to drive wheels for propelling the vehicle on an underlying surface;
a cab supported on the chassis;
a stack having a lower end supported on the chassis and having a length which extends vertically upward exteriorly adjacent the cab to an upper end;
a support assembly which supports the stack on the cab at a location spaced vertically below the upper end of the stack and which comprises a frame having a length, a width, and a thickness;
a first mounting which mounts a first of lengthwise opposite ends of the frame on the stack and a second mounting which mounts a second of lengthwise opposite ends of the frame on the cab;
a rotor which is disposed on the frame centrally between the first and second lengthwise opposite ends of the frame for turning about an axis of turning extending widthwise of the frame;
the rotor further comprising a central through-hole having a straight axis which intersects the axis of turning;
one of the first and second mountings comprising a rod having length which is parallel with length of the stack and which passes coaxially through the central through-hole in the rotor with sufficient length and clearance to guide the rotor for coaxial translation along, and coaxial turning on, the rod;
and first and second elastomeric isolators which are held compressed at respective lengthwise opposite ends of the frame which are held compressed thicknesswise of the frame by the first and second mountings.

14. The vehicle as set forth in claim 13 wherein the first mounting mounts the frame on the stack and the second mounting mounts the frame on the cab.

15. The vehicle as set forth in claim 14 wherein the rod is mounted on a bracket of the first mounting, and the elastomeric isolators are held compressed by metal fasteners which fasten the lengthwise opposite ends of the frame to a bracket of the second mounting.

16. The vehicle as set forth in claim 15 wherein the cab has a rear wall and a side wall extending frontally of the vehicle from the rear wall, and the bracket of the second mounting is fastened to the side wall.

17. The vehicle as set forth in claim 16 in which the axis of turning of the rotor extends laterally of the vehicle, and the elastomeric isolators are held compressed in a vertical direction.

18. The vehicle as set forth in claim 13 wherein the prime mover comprises an internal combustion engine, and the stack is a part of an exhaust system of the engine.

* * * * *